(12) United States Patent
Ufkes et al.

(10) Patent No.: US 11,995,930 B2
(45) Date of Patent: May 28, 2024

(54) ELECTRONIC SLIDING BOLT SHUTTER LOCK APPARATUS AND SYSTEM

(71) Applicant: Security Enhancement Systems, LLC, Northbrook, IL (US)

(72) Inventors: Philip J. Ufkes, Sullivan's Island, SC (US); Steven J. Malone, Mt. Pleasant, SC (US); Matthew Frank Trapani, Deerfield, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 77 days.

(21) Appl. No.: 17/682,547

(22) Filed: Feb. 28, 2022

(65) Prior Publication Data
US 2022/0180681 A1 Jun. 9, 2022

Related U.S. Application Data

(63) Continuation-in-part of application No. 17/590,527, filed on Feb. 1, 2022, which is a continuation of
(Continued)

(51) Int. Cl.
*G07C 9/00* (2020.01)
*E05B 67/36* (2006.01)
(Continued)

(52) U.S. Cl.
CPC .......... *G07C 9/00309* (2013.01); *E05B 67/36* (2013.01); *E05C 19/08* (2013.01); *G06F 21/00* (2013.01); *H04W 4/80* (2018.02); *E05B 17/0016* (2013.01); *E05B 47/0004* (2013.01); *E05B 2047/0057* (2013.01);
(Continued)

(58) Field of Classification Search
CPC ............ G07C 9/00309; G07C 9/00571; G07C 2009/00642; E05B 2047/0069; E05B 2047/0094; E05B 67/22
See application file for complete search history.

(56) References Cited

U.S. PATENT DOCUMENTS 4,567,740 A * 2/1986 Kelly ..................... E05B 67/38
70/55
2014/0028443 A1 1/2014 Ebner
(Continued)

FOREIGN PATENT DOCUMENTS

GB        2343704 A * 5/2000 ............ E05B 67/36
WO    WO-2019110989 A1 * 6/2019

*Primary Examiner* — Nabil H Syed
(74) *Attorney, Agent, or Firm* — Gregory Finch; Finch Paolino, LLC

(57) ABSTRACT

An electronic straight shackle lock apparatus and system. Aspects of the present disclosure provide for a keyless, electronic straight shackle lock that provides a high level of security at a relatively low cost and without any opening for a physical mechanical key. Certain embodiments provide for an easy-to-use and compact adapter for a keyless, electronic straight shackle lock and the ability to manually override the electronic lock. Certain benefits and advantages of the present disclosure include a compact and flexible locking system that can be installed on many different enclosures and doors that can be locked and unlocked using an electronic device via a wireless signal.

20 Claims, 6 Drawing Sheets

Related U.S. Application Data application No. 17/232,124, filed on Apr. 15, 2021, now Pat. No. 11,238,680, which is a continuation of application No. 16/806,553, filed on Mar. 2, 2020, now Pat. No. 10,984,618, which is a continuation of application No. 16/103,554, filed on Aug. 14, 2018, now Pat. No. 10,580,237, which is a continuation-in-part of application No. 13/414,348, filed on Mar. 7, 2012, now Pat. No. 10,089,811.

(60) Provisional application No. 63/289,616, filed on Dec. 14, 2021, provisional application No. 63/205,651, filed on Feb. 28, 2021, provisional application No. 61/450,185, filed on Mar. 8, 2011.

(51) Int. Cl.
*E05C 19/08* (2006.01)
*G06F 21/00* (2013.01)
*H04W 4/80* (2018.01)
*E05B 17/00* (2006.01)
*E05B 47/00* (2006.01)
*H04W 12/08* (2021.01)

(52) U.S. Cl.
CPC ......... *E05B 2047/0069* (2013.01); *E05B 2047/0094* (2013.01); *G07C 9/00571* (2013.01); *G07C 2009/00642* (2013.01); *G07C 2009/00769* (2013.01); *H04W 12/08* (2013.01)

(56) References Cited

U.S. PATENT DOCUMENTS

2017/0301200 A1 10/2017 Siminoff
2017/0373723 A1 12/2017 Toivonen et al.
2022/0356736 A1* 11/2022 Mollick ............... E05B 67/24

* cited by examiner

ELECTRONIC SLIDING BOLT SHUTTER LOCK APPARATUS AND SYSTEM

CROSS-REFERENCE TO RELATED APPLICATIONS

This application claims the benefit of Provisional Patent Application Ser. No. 63/205,651, entitled "ELECTRONIC SLIDING BOLT SHUTTER LOCK" and having a filing date of Feb. 28, 2021; and this application is a continuation-in-part of U.S. patent application Ser. No. 17/590,527 filed on Feb. 1, 2022, entitled "KEYLESS PUCK LOCK APPARATUS AND SYSTEM" and assigned to the assignee of the present invention, said application claiming the benefit of U.S. provisional application Ser. No. 63/289,616, filed on Dec. 14, 2021, and said application being a continuation of U.S. patent application Ser. No. 17/232,124 filed on Apr. 15, 2021, entitled "KEYLESS PUCK LOCK APPARATUS AND SYSTEM" and assigned to the assignee of the present invention, said application being a continuation of U.S. patent application Ser. No. 16/806,553 filed on Mar. 2, 2020, entitled "KEYLESS PUCK LOCK APPARATUS AND SYSTEM" and assigned to the assignee of the present invention, said application being a continuation of U.S. patent application Ser. No. 16/103,554 filed on Aug. 14, 2018, entitled "KEYLESS PUCK LOCK APPARATUS AND SYSTEM" and assigned to the assignee of the present invention, said application being a continuation-in-part of U.S. patent application Ser. No. 13/414,348 filed on Mar. 7, 2012, now U.S. Pat. No. 10,089,811, entitled "LOCK" and assigned to the assignee of the present invention, said application claiming the benefit of U.S. provisional application Ser. No. 61/450,185, filed on Mar. 8, 2011; each of these applications being hereby incorporated by reference in their entireties.

FIELD

The present disclosure relates to the field of electronic access control systems and devices; in particular, an electronic straight shackle lock comprising a wireless communications interface.

BACKGROUND

There are many different enclosure-types that may be secured by a locking system comprising a conventional padlock mounted onto some form of hasp assembly to secure access to an enclosed area such as a shelter, lockbox, cargo container, refrigerators, commercial trucks, cabinet, gate, generators, trailers, and the like. A non-limiting example of one such lock is known as a "hockey puck" lock or puck lock that is also known as a hidden shackle padlock in the portable security industry. One example of a high security locking assembly includes a hockey puck lock that is mounted on a portable security hasp assembly.

Hidden shackle padlocks comprise a hidden shackle bolt that project and retract through a hasp to secure the lock onto the hasp when a user engages the bolt by turning a mechanical key to lock and unlock the lock. However, mechanical keys present a disadvantage in that it is difficult to administer key control across a set of disparate locks without implementing a complex key management system.

If a company has a significant number of locks in their inventory across many different locations, key control administration can be difficult and costly—especially in the case of lost or stolen keys. It is common to have a unique key for each lock, which creates significant maintenance issues when another person needs to access the lock.

Another disadvantage of using physical keys in a lock system is that the level of security is compromised by having a mechanical locking cylinder with an opening for the key. Many security experts consider such an opening a significant security flaw in a locking system. In a lock having an opening for a mechanical key, common cylinders are easily broken into with a standard hand drill, thereby allowing a person to easily rotate the shackle and unlock the lock.

Through applied effort, ingenuity, and innovation, Applicant has identified and improved a number of deficiencies and problems with mechanical locking devices. Applicant has developed a solution that is embodied by the present disclosure, as described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An aspect of the present disclosure is a keyless lock apparatus comprising a body portion comprising a C-shaped aperture defined by an upper lateral surface, a vertical side wall and a lower lateral surface, wherein the body portion comprises a cylindrical aperture vertically extending through a lower portion of the body portion and partially through an upper portion of the body portion; a straight shackle comprising a cylindrical body slidably disposed through the cylindrical aperture, the straight shackle comprising a groove disposed on a lower area of the cylindrical body, wherein an upper circumference of the cylindrical body is mateably interfaced with the cylindrical aperture at the upper portion of the body portion when the straight shackle is configured in a locked position, an adapter portion selectively interfaced with the C-shaped aperture of the body portion, the adapter portion comprising a protrusion disposed on a bottom surface of the adapter portion and a vertical aperture configured to receive the cylindrical body of the straight shackle therethrough, wherein the protrusion is configured to be mateably interfaced with a receiving channel disposed on the lower lateral surface of the body portion; a controller housed within an interior area of the body portion and configured to receive a wireless command signal from a mobile electronic device; an electronic actuator operably engaged with the controller, wherein the electronic actuator is operably configured to actuate a locking pin in response to a command by the controller, wherein the locking pin is securely interfaced with the groove disposed on the lower area of the cylindrical body of the straight shackle when the straight shackle is configured in the locked position; and a battery operably engaged with the controller and the electronic actuator to provide a flow of power to the controller and the electronic actuator.

In accordance with certain embodiments, the keyless lock apparatus may further comprise a wireless charging interface operably engaged with the battery. The keyless lock apparatus may further comprise an anti-tamper sensor housed in the interior area of the body portion and communicably engaged with the controller. In certain embodiments, the electronic actuator of the keyless lock apparatus may comprise a solenoid. In certain embodiments, the controller of the keyless lock apparatus may comprise a wireless transceiver. In accordance with certain embodiments, the controller may comprise a subscriber identity module. In accordance with certain embodiments, the controller may be communicably engaged with at least one remote server via a wireless communications network.

Another aspect of the present disclosure is a keyless lock apparatus comprising a body portion comprising a C-shaped aperture defined by an upper lateral surface, a vertical side wall and a lower lateral surface, wherein the body portion comprises a cylindrical aperture vertically extending through a lower portion of the body portion and partially through an upper portion of the body portion; a straight shackle comprising a cylindrical body slidably disposed through the cylindrical aperture, the straight shackle comprising a groove disposed on a lower area of the cylindrical body, wherein an upper circumference of the cylindrical body is mateably interfaced with the cylindrical aperture at the upper portion of the body portion when the straight shackle is configured in a locked position; a controller housed within an interior area of the body portion and configured to receive a wireless command signal from a mobile electronic device; an electronic actuator operably engaged with the controller, wherein the electronic actuator is operably configured to actuate a locking pin in response to a command by the controller, wherein the locking pin is securely interfaced with the groove disposed on the lower area of the cylindrical body of the straight shackle when the straight shackle is configured in the locked position; and a battery operably engaged with the controller and the electronic actuator to provide a flow of power to the controller and the electronic actuator.

Another aspect of the present disclosure is an electronic access control system comprising a keyless lock apparatus comprising a body portion comprising a C-shaped aperture defined by an upper lateral surface, a vertical side wall and a lower lateral surface, wherein the body portion comprises a cylindrical aperture vertically extending through a lower portion of the body portion and partially through an upper portion of the body portion; a straight shackle comprising a cylindrical body slidably disposed through the cylindrical aperture, the straight shackle comprising a groove disposed on a lower area of the cylindrical body, wherein an upper circumference of the cylindrical body is mateably interfaced with the cylindrical aperture at the upper portion of the body portion when the straight shackle is configured in a locked position; a controller housed within an interior area of the body portion, the controller comprising a wireless transceiver; an electronic actuator operably engaged with the controller, wherein the electronic actuator is operably configured to actuate a locking pin in response to a command by the controller, wherein the locking pin is securely interfaced with the groove disposed on the lower area of the cylindrical body of the straight shackle when the straight shackle is configured in the locked position; and a battery operably engaged with the controller and the electronic actuator to provide a flow of power to the controller and the electronic actuator; a mobile electronic device communicably engaged with the controller via a wireless communications interface, wherein the mobile electronic device is configured to communicate an unlock command to the controller via the wireless communications interface.

In accordance with certain aspects of the present disclosure, the controller may further comprise a site integration module. In certain embodiments, the site integration module may be communicably engaged with one or more security alarm, environmental alarm, networking alarm, gas gauge alarm, video camera, or perimeter security system via the wireless communications interface. In accordance with certain embodiments, the electronic access control system may further comprise a wireless charging interface operably engaged with the battery. In accordance with certain embodiments, the controller is communicably engaged with at least one remote server via the wireless communications interface. In accordance with certain embodiments, the electronic actuator may comprise a solenoid.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
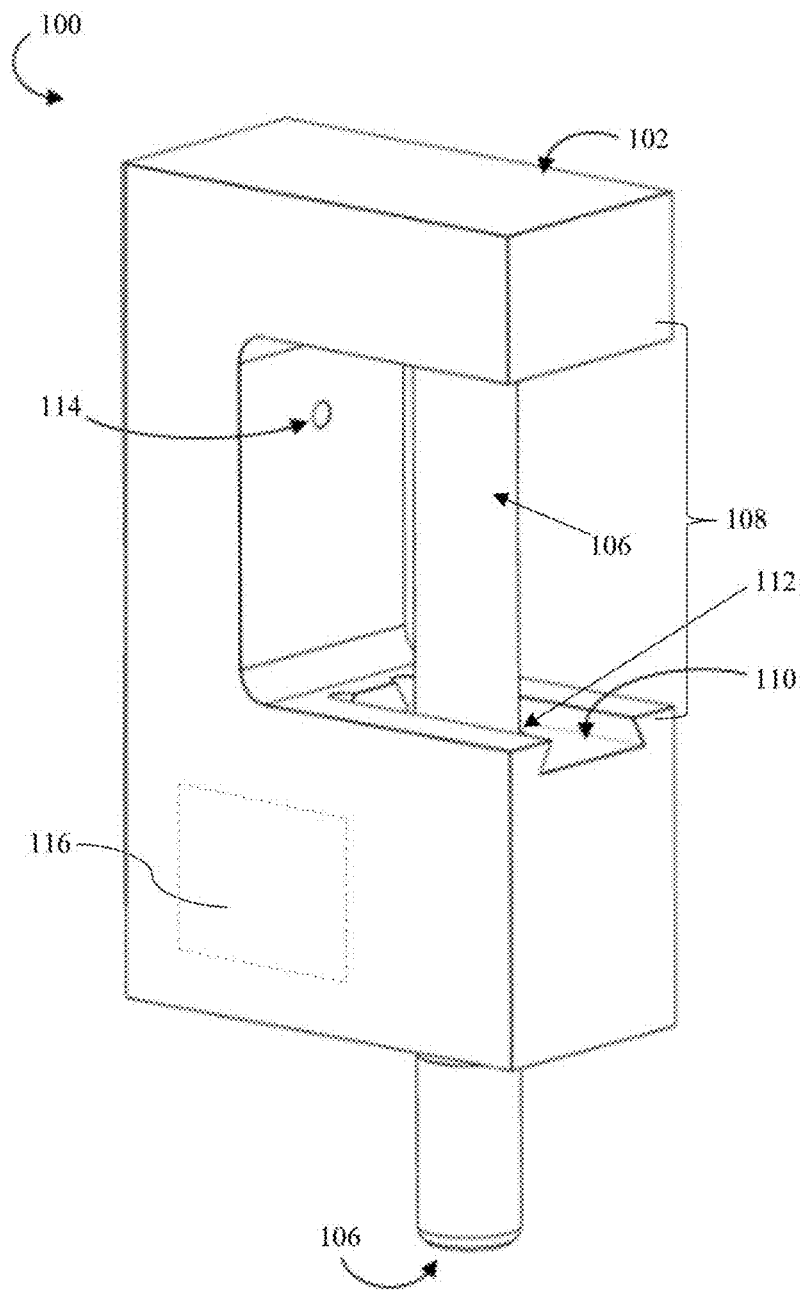
FIG. 1 is a perspective view of a keyless straight shackle lock in a locked configuration, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for a keyless, electronic straight shackle lock that provides a high level of security at a relatively low cost and without any opening for a physical mechanical key.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

Certain benefits and advantages of the present disclosure include a keyless, electronic straight shackle lock that provides a high level of security at a relatively low cost and without any opening for a physical mechanical key.

Certain benefits and advantages of the present disclosure include a keyless straight shackle lock that minimizes exposure of components, particularly the internal components of the lock, to moisture or other contaminants, and minimizes corrosion or oxidation of metallic lock components.

Certain benefits and advantages of the present disclosure include an easy-to-use and compact adapter for a keyless, electronic straight shackle lock and the ability to manually override the electronic lock.

Certain benefits and advantages of the present disclosure include a compact and flexible locking system that can be installed on many different enclosures and doors that can be locked and unlocked using an electronic device via a wireless signal.

One or more exemplary embodiments of the present invention, as shown and described in more detail in FIGS. 1-6, provide for a keyless, electronic straight shackle lock system that enables relatively low cost and high security construction. In accordance with certain embodiments, the keyless straight shackle lock system of the present disclosure uses a keyless straight shackle lock assembly. Accordingly, the keyless straight shackle electronic lock system in accordance with one or more embodiments of the present invention does not have a physical keyway and therefore eliminates a security attack point present in prior art straight shackle locks.

In accordance with certain exemplary embodiments of the keyless electronic straight shackle lock system of the present disclosure, an electronic latching mechanism is actuated upon receipt of an unlock transmission signal (i.e., data packet recognized by control module) from a latched position to an unlatched position, which enables a user to actuate a keyless smart straight shackle lock shackle from a locked position to an unlocked position. A control module transmits an electrical signal (e.g., a 12 V signal) for actuating an electronic latching mechanism. Various other well-known communications protocols may be used between the computing device and control module including for example BLUETOOTH, near field communication (NFC), GPS, cellular, Bluetooth low energy (BLE), and the like, which may also include well-known existing encryption technologies to secure communications.

In accordance with certain exemplary embodiments of the keyless electronic straight shackle lock system of the present disclosure, a power source provides power to the control module. The power source may include one or more Alternative Current (AC) sources, Direct Current (DC) sources such as one or more batteries, combinations of both, including use of well-known uninterruptible power supply (UPS) systems. A keyless electronic straight shackle lock may include a latch member driven by a solenoid. Further, the manner of delivery of power to the latching solenoid for operation and control may be accomplished by a variety of mechanisms or systems, including wired, wireless, network based, etc. The keyless electronic straight shackle lock system may optionally include a site integration module in communication with the control module using well-known communication protocols such as CAN, Bluetooth, BTLE, WiFi, LORA, cellular, serial, binary switching, SNMP, etc. An integration module interfaces to various security alarms, environmental alarms, networking alarms, gas gauge alarms, video cameras, perimeter security and other related systems.

For example, well-known computing devices (e.g., a mobile computing device such as a mobile phone) using well known Bluetooth, Near Field Communication (NFC), or other well-known technologies (e.g., location-based systems) may be used to activate a control module to power the keyless electronic straight shackle lock to enable a keyless (wired or wireless) operation. For example, the keyless electronic straight shackle lock system may comprise a BLUETOOTH module powered by an internal battery or other power source that may receive control signals from a mobile device in a well-known manner to enable supply of power to a latching mechanism such as a solenoid.

Embodiments of the keyless electronic straight shackle lock system of the present disclosure may optionally include a backup power source to directly power a control module in case of complete failure of power source (including UPS systems). The backup power source may be directly wired to the control module with one or more terminal outside of the enclosure to provide power to the control module. In accordance with certain aspects of the present disclosure, the one or more terminal may comprise a USB-C interface. Once the control module has power, it is able to receive control signals and data from the computing device to actuate the keyless electronic straight shackle lock.

Embodiments of the keyless electronic straight shackle lock system of the present disclosure may comprise several key features, including: solid brass monoblock padlock with a chrome-plated steel jacket; hardened steel pin; saw and cut resistant; corrosion-resistant (solid brass or titanium body); environmentally sealed, IP-67; −40 to +65 C temp range; compatible with standard padlock hasps; comes with electronic locking features, specs, and firmware; BLE, mobile electronic access control application, long life battery, and USB-C port.

In accordance with certain aspects of the present disclosure, a keyless electronic straight shackle lock may be used to secure a variety of enclosures, including: Gates; Shrouds; Cabinets; Generators; Equipment racks; HVAC anti-theft cages; Miscellaneous enclosures; Toolboxes; Safety and risk avoidance (Valves, AC power panels, electrical meter bases, tag out, arc flash protection, solar systems); and the like. Industry-specific applications may include Telecomm (wireline and wireless); Public utilities; Industrial; Military; Schools and Colleges; Trucking (produce and frozen foods); Oil and gas; Government; Medical; Law enforcement; Rail (switches, cabinets, huts, lighting).

Exemplary embodiments of the keyless electronic straight shackle lock system of the present disclosure may include one or more remote connectivity features, including: Tamper notification, local tamper alarm (with or without voice), lock on hasp, geofencing, Low battery, remote unlock, hasp-moved detection, motion sensor, high RF in area, and backhaul of other site alarms such as hi/low temp, door alarm and AC power fail. In accordance with certain embodiments, one or more remote connectivity components may comprise 4G/5G radio; eSIM; Nano (4FF) SIM card or MFF2; SIM data plan; and M2M Host.

Figure 2:
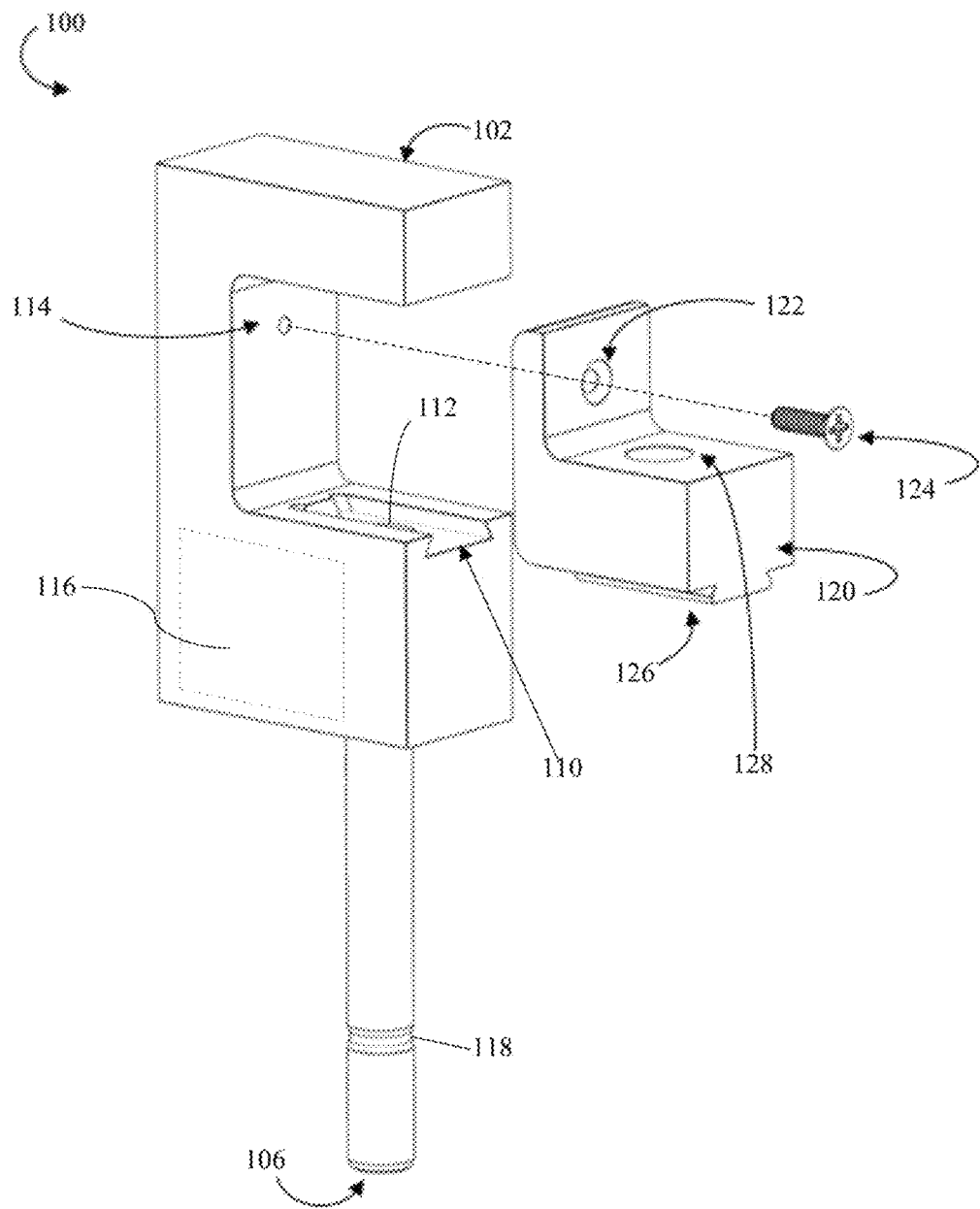
FIG. 2 is a component view of a keyless straight shackle lock and a lock adapter, in accordance with certain aspects of the present disclosure.
Figure 3:
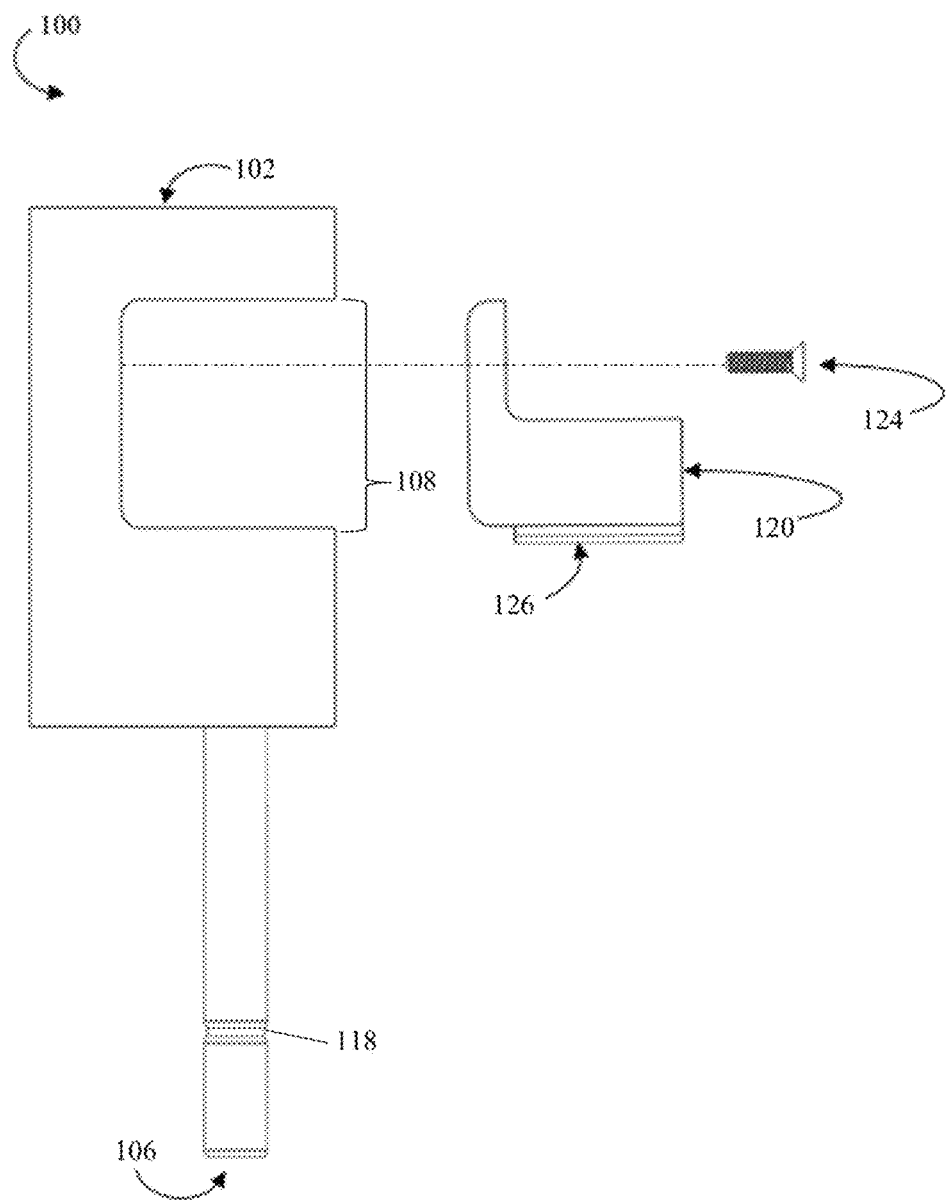
FIG. 3 is a plan view of a keyless straight shackle lock and a lock adapter, in accordance with certain aspects of the present disclosure.
Figure 4:
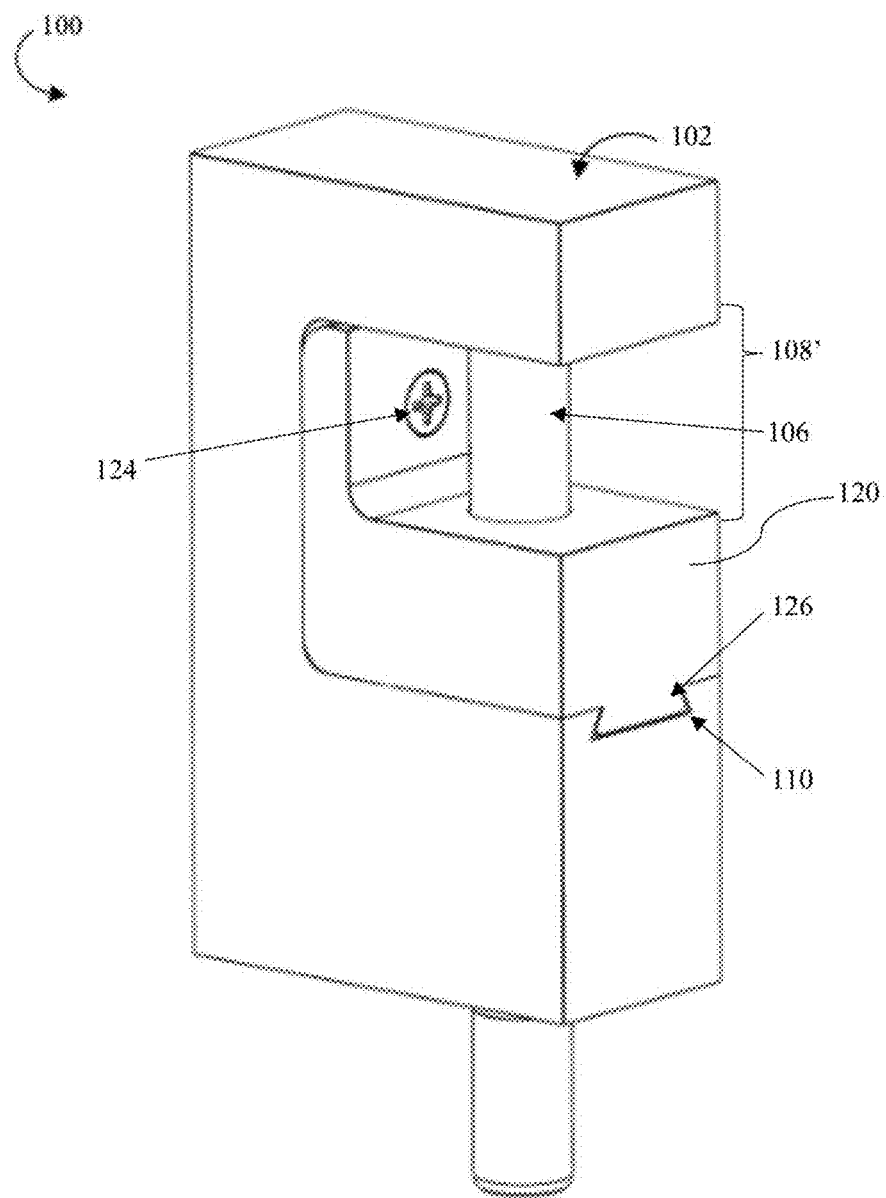
FIG. 4 is a perspective view of a keyless straight shackle lock and a lock adapter in a locked configuration, in accordance with certain aspects of the present disclosure.
Figure 5:
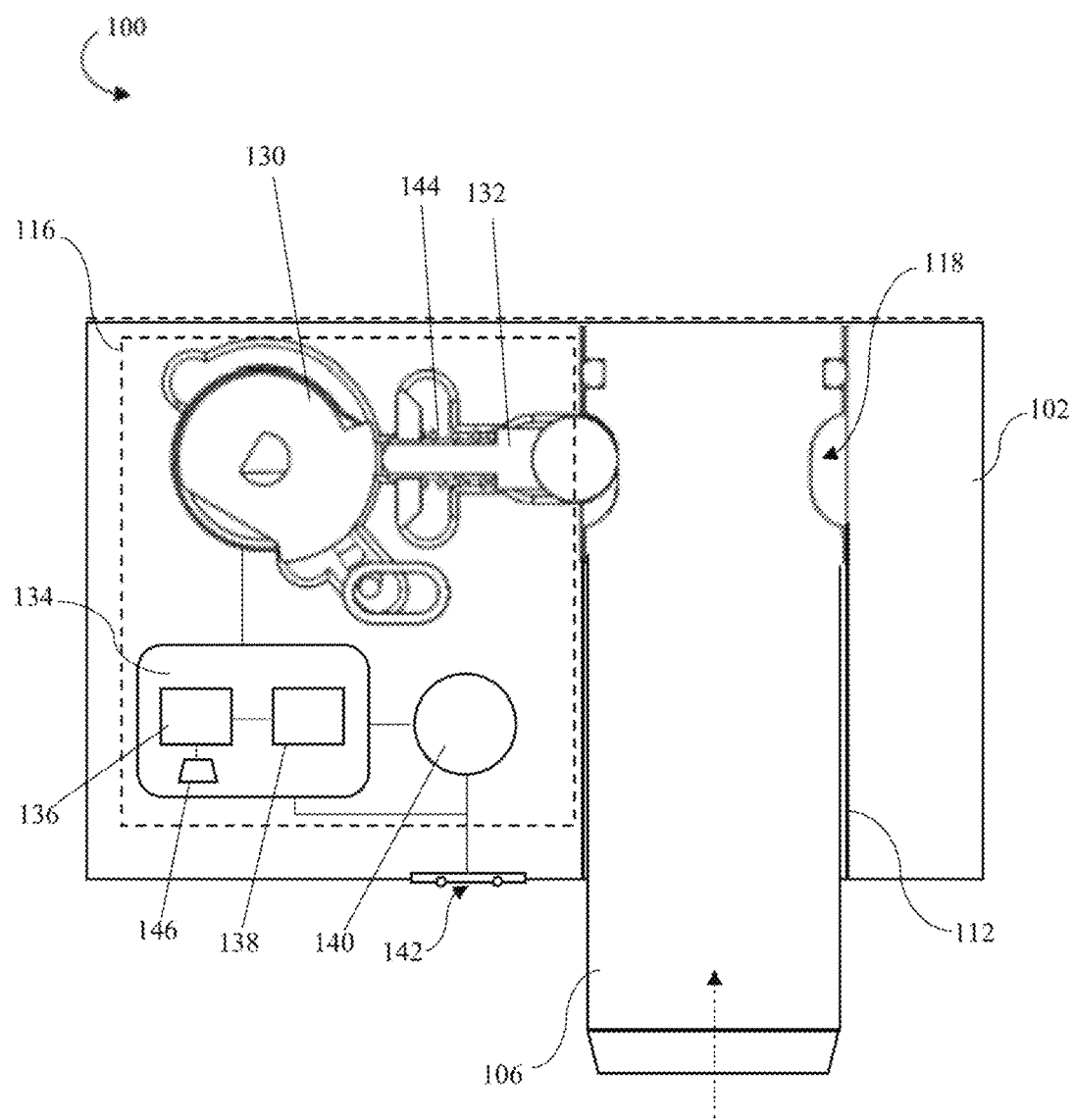
FIG. 5 is a cross-sectional view of a portion of a keyless straight shackle lock, in accordance with certain aspects of the present disclosure.

Turning now descriptively to the drawings, in which similar reference characters denote similar elements throughout the several views, FIGS. 1-4 depict various views of a keyless straight shackle lock 100, in accordance with various aspects of the present disclosure. Referring to FIG. 1, keyless straight shackle lock 100 may comprise a lock body 102 comprising an upper area and a lower area defining a C-shaped aperture 108 extending therebetween. C-shaped aperture 108 is configured to receive a hasp staple, latch or the like in order to selectively secure keyless straight shackle lock 100 to a cabinet, gate, door or other access point or enclosure. In accordance with certain aspects of the present dislocation, lock body 102 may comprise a smooth/ unitary surface without an opening for a mechanical keyhole or lockset. Keyless straight shackle lock 100 may further comprise a shackle 106 slidably coupled to lock body 102. Shackle 106 may comprise a substantially cylindrical shackle bolt constructed from hardened steel or other customary metal alloy commonly used in security applications. In accordance with certain aspects of the present disclosure, shackle 106 may comprise a notch or groove 118 disposed on a lower area or circumference of shackle 106 (as shown in FIG. 2). Groove 118 may act as a mechanical locking interface between shackle 106 and lock pin 118, as shown in FIG. 5. Lock body 102 may comprise a shackle aperture 112 extending completely through a vertical portion of the lower area of lock body 102 and partially through a vertical portion of the upper area of lock body 102. Shackle 106 may extend vertically through shackle aperture 112 and may be slidably engaged from a locked position to an unlocked position, wherein an upper end of shackle 106 is mateably interfaced with an upper portion of shackle aperture 112 when shackle 106 is configured in the locked position.

In accordance with certain aspects of the present disclosure, lock body 102 may comprise an adapter channel 110 comprising a keyed groove disposed on an upper surface of the lower area of lock body 102. In accordance with certain aspects of the present disclosure, adapter channel 110 is configured to receive and retain an adapter 120 (as shown in FIGS. 2-4). Lock body 102 may further comprise a screw aperture 114 for receiving a retaining screw 124 (as shown in FIGS. 2-4) for securely coupling adapter 120 to lock body 102. In accordance with further aspects of the present disclosure, keyless straight shackle lock 100 may further comprise an internal area 116 defined by a hollow interior chamber that is located inside a portion of the lock body 102; optionally located within the lower area of lock body 102. Internal area 116 may be configured to securely house the electronic components and mechanical locking components of keyless straight shackle lock 100, as shown and described in FIG. 5, below.

Referring now to FIGS. 2-4, keyless straight shackle lock 100 may further comprise a lock adapter 120. Lock adapter 120 may comprise a vertical side wall and a lower portion comprising a connector protrusion 126 disposed along a bottom length of lock adapter 120. Connector protrusion 126 may be keyed such that connector protrusion 126 and adapter channel 110 may be mateably coupled by sliding adapter 120 into the C-shaped aperture 108 of lock body 102. In accordance with certain embodiments, adapter 120 may comprise an adapter shackle aperture 120 that extends vertically through adapter 120. Adapter shackle aperture 120 may be oriented such that adapter shackle aperture 120 is aligned with shackle aperture 112 when adapter 120 is mateably interfaced with lock body 102. Adapter 120 may further comprise an adapter screw hole 122 disposed on a vertical surface of adapter 120. Adapter screw hole 122 may be oriented such that adapter screw hole 122 and screw aperture 114 are aligned when adapter 120 is mateably interfaced with lock body 102 (as shown in FIG. 4). Keyless straight shackle lock 100 may further comprise an adaptor screw 124 configured to securely couple adapter 120 and lock body 102 when adapter 120 is mateably interfaced with lock body 102. In accordance with certain aspects of the present disclosure adapter 120 may be configured to reduce the size of the area of the C-shaped aperture 108 of lock body 102 when adapter 120 is mateably interfaced with lock body 102 (as shown in FIG. 4). Adapter 120 reduces the size of the area of the C-shaped aperture 108 to enable enhanced security of keyless straight shackle lock 100 by shielding and reducing the exposure of shackle 106 when shackle 106 is configured in a locked position.

Referring now to FIG. 5, a cross-sectional view of a portion of the keyless straight shackle lock 100 is shown. In accordance with certain aspects of the present disclosure, keyless straight shackle lock 100 comprises a plurality of electronic and mechanical locking components housing within interior area 116. In accordance with certain aspects of the present disclosure, the plurality of electronic and mechanical locking components comprises an electronic actuator 130, a lock pin 132, a spring 144, a controller 134, a processor 136, a wireless communications chipset 138 and a battery 140. In accordance with certain embodiments, keyless straight shackle lock 100 may be configured in a locked configuration by a user applying upward force to shackle 106 such that shackle 106 slides vertically in shackle aperture 112 until groove 118 is mechanically interfaced with pin 132. Pin 132 may be retained in place by electronic actuator 130 being rotated in a closed position, as shown in FIG. 5, such that pin 132 is prevented from being displaced (i.e., blocked). Electronic actuator 130 may be operably engaged to rotate from a closed position, as shown in FIG. 5, to an open position such that a flat portion of electronic actuator is oriented toward pin 132, thereby enabling the pin to be pushed into a recess by spring 144 and discontinuing the mechanical interface between pin 132 and groove 118. Shackle 106 may then freely slide vertically in shackle aperture 112 to enable a user to connect or disconnect keyless straight shackle lock 100 from a hasp or other connection point. In accordance with certain embodiments, electronic actuator 130 may comprise a solenoid configured to drive and retract pin 132 to mechanically interface with groove 118. In such embodiments, spring 144 may be optionally eliminated. Numerous alternative embodiments are anticipated for establishing a locking interface between pin 132 and groove 118 according to various methods known in the art.

In accordance with certain aspects of the present disclosure, controller 134 is operably engaged with electronic actuator 130 to command electronic actuator 130 to actuate between an open (i.e., unlocked) position and a closed (i.e., locked) position (as shown in FIG. 5). Controller 134 may comprise a microprocessor 136 configured to process an input from wireless communications chipset 138. Wireless communications chipset 138 may comprise a wireless transceiver and may enable one or more wireless communications interface according to one or more wireless communications protocol, including but not limited to BLUETOOTH, BLUETOOTH Low Energy (BLE), Near Field Communication (NFC) and the like. Controller 134 may be configured to establish a wireless data transfer interface with one or more mobile devices (e.g., a smartphone) to receive a wireless key code/command and process the wireless key code/command to actuate electronic actuator 130 in response to authenticating the wireless key code/command. A battery 140 may be operably engaged with controller 134 to provide a flow of power to controller 134, processor 136, wireless communications chipset 138 and electronic actuator 130. Battery 140 may optionally be engaged with a terminal 142 to enable a wireless charging interface between a hasp with a wireless charging interface and/or an external power supply (e.g., backup battery). In certain embodiments, terminal 142 may be communicably engaged with a wireless data transfer interface of a hasp or other device to enable a transmission of data to and from controller 136. In certain embodiments, terminal 142 may comprise a USB-C interface to enable a power and data transfer interface between the battery and controller and one or more connected devices or power sources.

Figure 6:
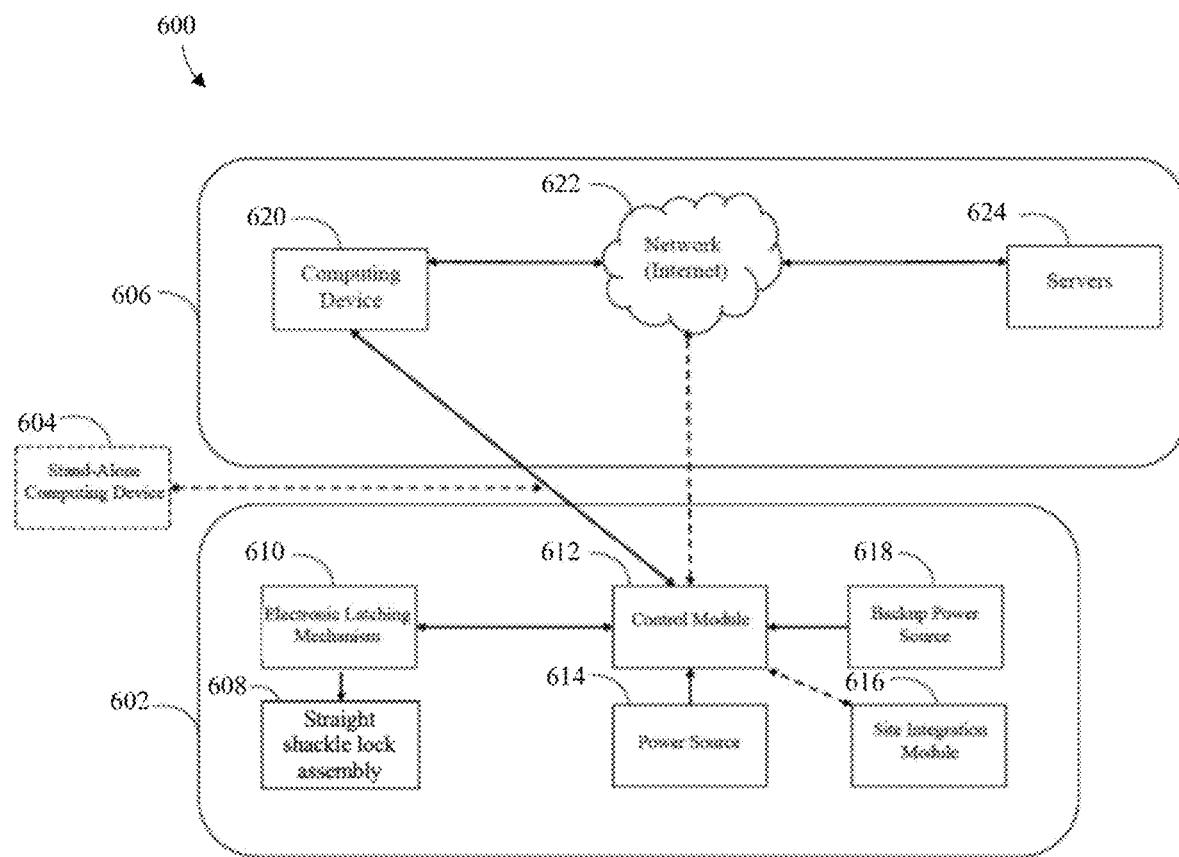
FIG. 6 is a system diagram of a keyless straight shackle lock system, in accordance with certain aspects of the present disclosure.

Referring now to FIG. 6, a system diagram of a keyless straight shackle lock system 600 is shown. In accordance with certain aspects of the present disclosure, keyless straight shackle lock system 600 may comprise a keyless straight shackle lock apparatus 602. In certain embodiments, keyless straight shackle lock apparatus 602 may be embodied/substituted as keyless straight shackle lock 100, as shown and described in FIGS. 1-5. In accordance with certain embodiments, keyless straight shackle lock system 600 may comprise keyless straight shackle lock apparatus 602, a stand-alone computing device 604, and an electronic access control system 606. In accordance with certain aspects of the present disclosure, keyless straight shackle lock apparatus 602 may comprise a straight shackle lock assembly 608, an electronic latching mechanism 610, a control module 612, a power source 614, a site integration module 616 and an optional backup power source 618. In accordance with certain aspects of the present disclosure, straight shackle lock assembly 608 may be comprise a body portion comprising a C-shaped aperture defined by an upper lateral surface, a vertical side wall and a lower lateral surface, wherein the body portion comprises a cylindrical aperture vertically extending through a lower portion of the body portion and partially through an upper portion of the body portion; and a straight shackle comprising a cylindrical body slidably disposed through the cylindrical aperture, the straight shackle comprising a groove disposed on a lower area of the cylindrical body, wherein an upper circumference of the cylindrical body is mateably interfaced with the cylindrical aperture at the upper portion of the body portion when the straight shackle is configured in a locked position, an adapter portion selectively interfaced with the C-shaped aperture of the body portion, the adapter portion comprising a protrusion disposed on a bottom surface of the adapter portion and a vertical aperture configured to receive the cylindrical body of the straight shackle therethrough, wherein the protrusion is configured to be mateably interfaced with a receiving channel disposed on the lower lateral surface of the body portion. In accordance with certain aspects of the present disclosure, electronic latching mechanism 610 may comprise an electronic actuator operably engaged with control module 612 to actuate a locking pin in response to a command by control module 612. In certain embodiments, electronic latching mechanism 610 may comprise a solenoid. In certain embodiments, site integration module 616 may be communicably engaged with control module 612 via a wired interface and/or via one or more well-known communication protocols such as CAN, BLUETOOTH, BLE, WiFi, LORA, cellular, serial, binary switching, SNMP and the like. Site integration module 616 may be operably configured to establish one or more wireless or wireline communication interfaces with one or more various security alarms, environmental alarms, networking alarms, gas gauge alarms, video cameras, perimeter security and other related systems.

In accordance with certain aspects of the present disclosure, stand-alone computing device 604 may be communicably engaged with control module 612 via a wireless communications interface. In certain embodiments, stand-alone computing device 604 may comprise a smart phone or tablet computer. Stand-alone computing device 604 may comprise one or more wireless access codes stored thereon configured to command control module 612 to actuate electronic latching mechanism 610 and open straight shackle lock assembly 608. In accordance with certain aspects of the present disclosure, keyless straight shackle lock apparatus 602 may be communicably engaged with a networked computing device 620. Networked computing device 620 may comprise a smart phone, tablet computer, personal computer, laptop computer, developer workstation, desktop computer and the like. Networked computing device 620 may be communicably engaged with one or more remote servers 624 via a network interface 622 (e.g., the Internet). Control module 612 may be communicably engaged with computing device 620 and/or remote servers 624 via the network interface 622. Control module 612 may further be communicably engaged with computing device 620 via a wireless communications interface.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top, "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A keyless lock apparatus comprising:
a body portion comprising a C-shaped aperture defined by an upper lateral surface, a vertical side wall and a lower lateral surface,
wherein the body portion comprises a cylindrical aperture vertically extending through a lower portion of the body portion and partially through an upper portion of the body portion;
a straight shackle comprising a cylindrical body slidably disposed through the cylindrical aperture, the straight shackle comprising a groove disposed on a lower area of the cylindrical body,
wherein an upper circumference of the cylindrical body is mateably interfaced with the cylindrical aperture at the upper portion of the body portion when the straight shackle is configured in a locked position,
an adapter portion selectively interfaced with the C-shaped aperture of the body portion, the adapter portion comprising a protrusion disposed on a bottom surface of the adapter portion and a vertical aperture configured to receive the cylindrical body of the straight shackle therethrough,
wherein the protrusion is configured to be mateably interfaced with a receiving channel disposed on the lower lateral surface of the body portion;
a controller housed within an interior area of the body portion and configured to receive a wireless command signal from a mobile electronic device;
an electronic actuator operably engaged with the controller, wherein the electronic actuator is operably configured to actuate a locking pin in response to a command by the controller,
wherein the locking pin is securely interfaced with the groove disposed on the lower area of the cylindrical body of the straight shackle when the straight shackle is configured in the locked position; and
a battery operably engaged with the controller and the electronic actuator to provide a flow of power to the controller and the electronic actuator.

2. The keyless lock apparatus of claim 1 further comprising a wireless charging interface operably engaged with the battery.

3. The keyless lock apparatus of claim 1 further comprising an anti-tamper sensor housed in the interior area of the body portion and communicably engaged with the controller.

4. The keyless lock apparatus of claim 1 wherein the electronic actuator comprises a solenoid.

5. The keyless lock apparatus of claim 1 wherein the controller comprises a wireless transceiver.

6. The keyless lock apparatus of claim 5 wherein the controller comprises a subscriber identity module.

7. The keyless lock apparatus of claim 6 wherein the controller is communicably engaged with at least one remote server via a wireless communications network.

8. A keyless lock apparatus comprising:
a body portion comprising a C-shaped aperture defined by an upper lateral surface, a vertical side wall and a lower lateral surface,
wherein the body portion comprises a cylindrical aperture vertically extending through a lower portion of the body portion and partially through an upper portion of the body portion;
a straight shackle comprising a cylindrical body slidably disposed through the cylindrical aperture, the straight shackle comprising a groove disposed on a lower area of the cylindrical body,
wherein an upper circumference of the cylindrical body is mateably interfaced with the cylindrical aperture at the upper portion of the body portion when the straight shackle is configured in a locked position;
a controller housed within an interior area of the body portion and configured to receive a wireless command signal from a mobile electronic device;
an electronic actuator operably engaged with the controller, wherein the electronic actuator is operably configured to actuate a locking pin in response to a command by the controller,
wherein the locking pin is securely interfaced with the groove disposed on the lower area of the cylindrical body of the straight shackle when the straight shackle is configured in the locked position; and
a battery operably engaged with the controller and the electronic actuator to provide a flow of power to the controller and the electronic actuator.

9. The keyless lock apparatus of claim 8 further comprising a wireless charging interface operably engaged with the battery.

10. The keyless lock apparatus of claim 8 further comprising an anti-tamper sensor housed in the interior area of the body portion and communicably engaged with the controller.

11. The keyless lock apparatus of claim 8 wherein the electronic actuator comprises a solenoid.

12. The keyless lock apparatus of claim 8 wherein the controller comprises a wireless transceiver.

13. The keyless lock apparatus of claim 12 wherein the controller comprises a subscriber identity module.

14. The keyless lock apparatus of claim 13 wherein the controller is communicably engaged with at least one remote server via a wireless communications network.

15. An electronic access control system comprising:
a keyless lock apparatus comprising:
a body portion comprising a C-shaped aperture defined by an upper lateral surface, a vertical side wall and a lower lateral surface,
wherein the body portion comprises a cylindrical aperture vertically extending through a lower portion of the body portion and partially through an upper portion of the body portion;
a straight shackle comprising a cylindrical body slidably disposed through the cylindrical aperture, the straight shackle comprising a groove disposed on a lower area of the cylindrical body,
wherein an upper circumference of the cylindrical body is mateably interfaced with the cylindrical aperture at the upper portion of the body portion when the straight shackle is configured in a locked position;
a controller housed within an interior area of the body portion, the controller comprising a wireless transceiver;
an electronic actuator operably engaged with the controller, wherein the electronic actuator is operably configured to actuate a locking pin in response to a command by the controller,
wherein the locking pin is securely interfaced with the groove disposed on the lower area of the cylindrical body of the straight shackle when the straight shackle is configured in the locked position;

a battery operably engaged with the controller and the electronic actuator to provide a flow of power to the controller and the electronic actuator; and a mobile electronic device communicably engaged with the controller via a wireless communications interface, wherein the mobile electronic device is configured to communicate an unlock command to the controller via the wireless communications interface.

16. The electronic access control system of claim 15 wherein the controller further comprises a site integration module.

17. The electronic access control system of claim 16 wherein the site integration module is communicably engaged with one or more security alarm, environmental alarm, networking alarm, gas gauge alarm, video camera, or perimeter security system via the wireless communications interface.

18. The electronic access control system of claim 15 further comprising a wireless charging interface operably engaged with the battery.

19. The electronic access control system of claim 15 wherein the controller is communicably engaged with at least one remote server via the wireless communications interface.

20. The electronic access control system of claim 15 wherein the electronic actuator comprises a solenoid.

* * * * *